Jan. 11, 1966  J. S. WARHURST ETAL  3,228,369
DEPTH CONTROL SYSTEM

Filed May 25, 1964  3 Sheets-Sheet 1

INVENTORS
JOSEPH S. WARHURST
JAMES A. CARNELL
BY
Darby & Darby
ATTORNEYS

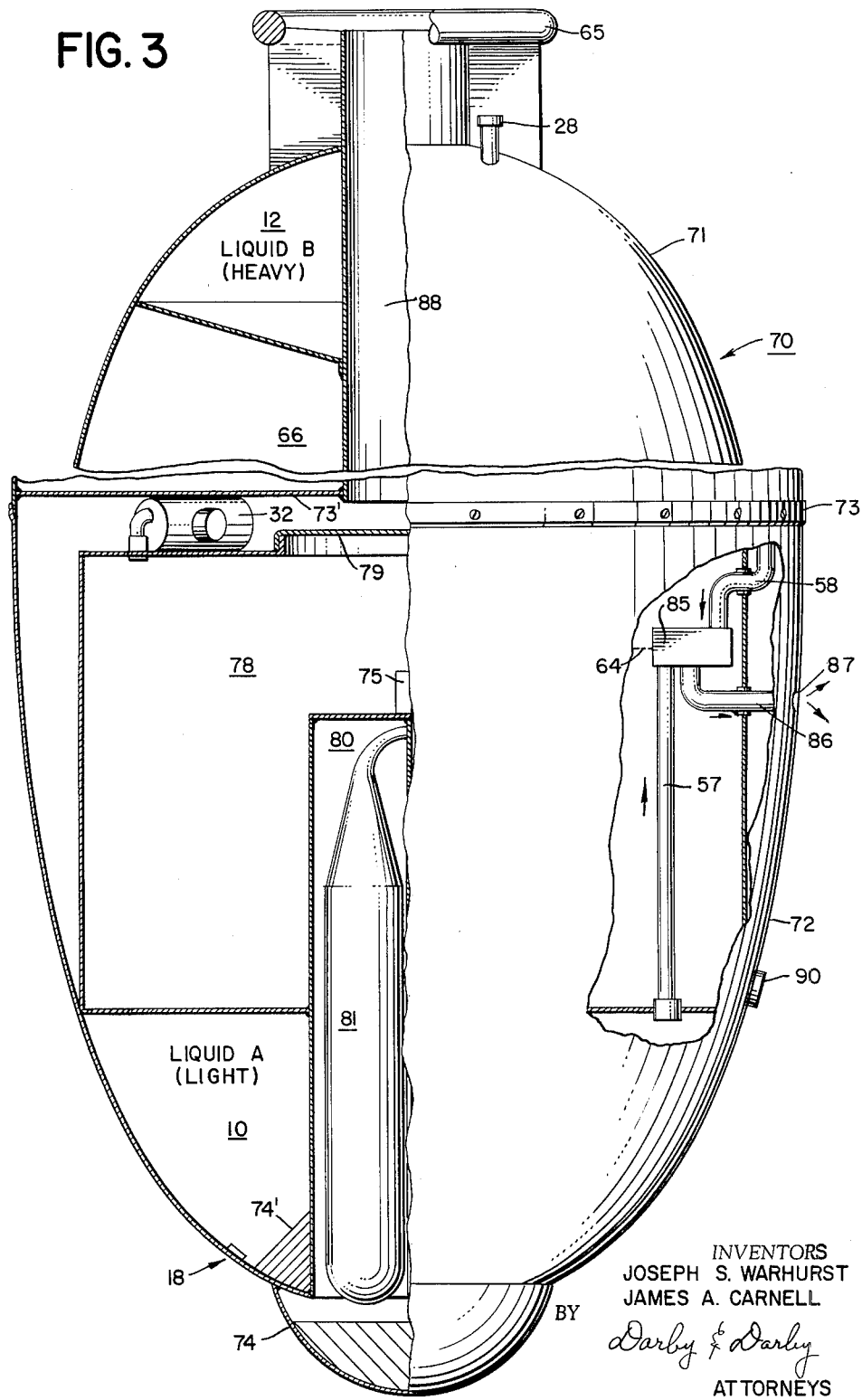

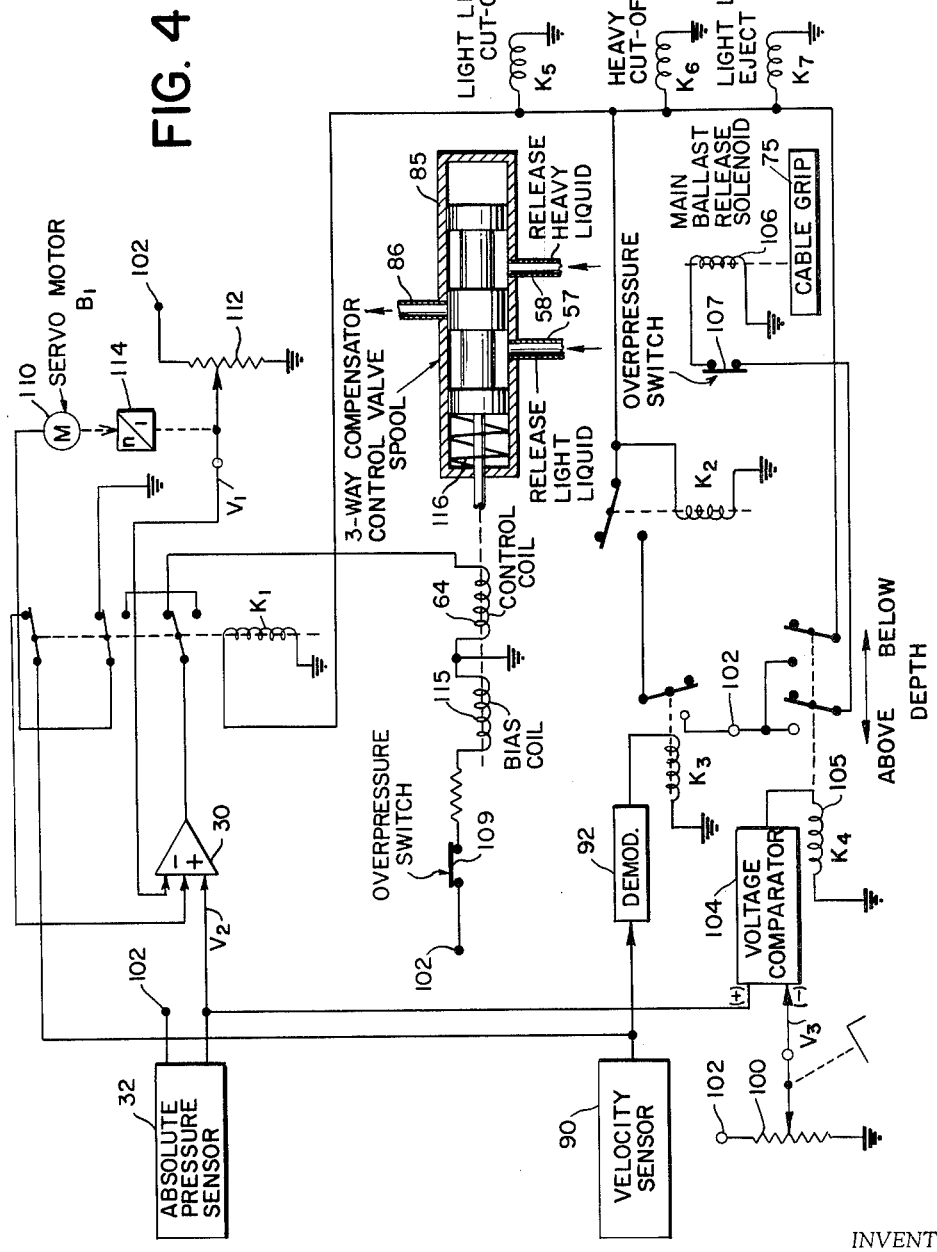

United States Patent Office 3,228,369
Patented Jan. 11, 1966

3,228,369
DEPTH CONTROL SYSTEM
Joseph S. Warhurst, Clinton, and James A. Carnell, Old Lyme, Conn., assignors to Lear Siegler, Inc., Long Island City, N.Y., a corporation of Delaware
Filed May 25, 1964, Ser. No. 369,946
11 Claims. (Cl. 114—16)

This invention relates to a system for controlling the buoyancy of a submerged vessel and more particularly to a flotation and depth control system for maintaining a vessel at a predetermined depth, or moving at a predetermined depth rate.

Many situations exist where it is desired to send a vessel to a predetermined submerged depth and then to maintain it at the depth. For example, in the field of oceanographic research and exploration, it is sometimes necessary to take acoustic soundings or make measurements over a period of time of the ocean current, temperature, etc., at the same depth. Also, when making certain acoustic measurements, the speed of the vessel must be controlled or limited to keep self generated noise to a minimum.

In the past, several systems have been used for effecting depth control by adjusting the buoyancy of a vessel. In one such system the vessel is submerged and then ballast weight is dropped to gain buoyancy. In another, water is pumped out against a pressure head to gain buoyancy and air-filled tanks are flooded to lose buoyancy. To effect hovering control at the described depth, thrust control systems have been devised which use propellers or jets of liquid or gas to develop thrust which is directed so as to maintain the desired depth.

While the described prior art systems all work, to some extent, it should be apparent that they suffer several disadvantages. For example, dropping ballast to achieve a desired depth is a non-reversible process, i.e., the vessel cannot lose buoyancy once it is gained by lightening ballast, and only a relatively coarse and non-proportional buoyancy adjustment can be made. Also, it should be obvious that the vessel cannot be made to hover at the desired depth by using this technique. The water pumping and flooding method for obtaining depth control requires a considerable amount of power and its operation is limited to relatively shallow depths. Hovering control of the vessel by using thrust devices to maintain depth requires a considerable and continuous expenditure of power and is therefore also undesirable. All of the systems described above also suffer from the common disadvantage of being relatively noisy and the noise produced is undesirable when acoustic measurements are being made.

The present invention relates to an improved system using a differential liquid density technique to adjust the buoyancy of the vessel. In accordance with the invention, the vessel whose depth and depth rate is to be controlled is provided with two tanks. Each tank contains a different liquid, one of which has a specific gravity (density) greater than that of the ambient fluid in which the vessel is to be submerged and the other of which has a specific gravity less than that of the ambient fluid. The two tanks are vented to the ambient fluid and also are connected to a valve system. Depth and speed measuring devices control the valve system to release a quantity of the heavier or lighter liquid, depending upon whether the buoyancy is to be raised or lowered to adjust the depth and speed of the vessel. The space of the fluid released from the tank is taken by the ambient fluid entering through the vent. Thus, the overall buoyancy of the vessel is controllably varied and the vessel is made to hover with neutral buoyancy at the predetermined depth or to move at the predetermined depth rate.

The depth control system of the present invention has several advantages over existing prior art systems. First of all, it is relatively quiet from an acoustic point of view. Secondly, the system will operate at any depth and pressure at which the fluids in the two tanks remain in liquid form. Additionally, buoyancy control is effected with minimum use of power since only an outflow valve mechanism is moved and only a very few moving parts are required. The depth control system of the present invention also automatically compensates for and is self adjusting to obtain neutral buoyancy even though the densities of the liquids in the tanks and/or the ambient liquid change.

It is therefore an object of the present invention to provide a depth and/or depth rate control system for a vessel in which two liquids of different densities are controllably released to achieve a desired buoyancy for the vessel.

A further object is to provide a depth and/or depth rate control system for a vessel in which a desired state of buoyancy is achieved at a predetermined depth or speed by releasing two liquids of different densities from the vessel to adjust its buoyancy.

An additional object is to provide a depth and/or depth rate control system in which the vessel has two tanks which contain separate fluids whose densities are respectively less and greater than that of the ambient fluid and in which the fluids are released from the tanks to achieve the required state of buoyancy of the vessel at a predetermined depth and/or depth rate.

Other objects and advantages of the present invention will become more apparent upon reference to the following specification and annexed drawings in which:

FIGURE 3 is an elevational view, taken partially in section and partially broken away, of a vessel utilizing the depth control system of the present invention;

FIGURE 4 is an electrical wiring diagram for operating the depth control system of the vessel of FIGURE 3.

Figure 1:
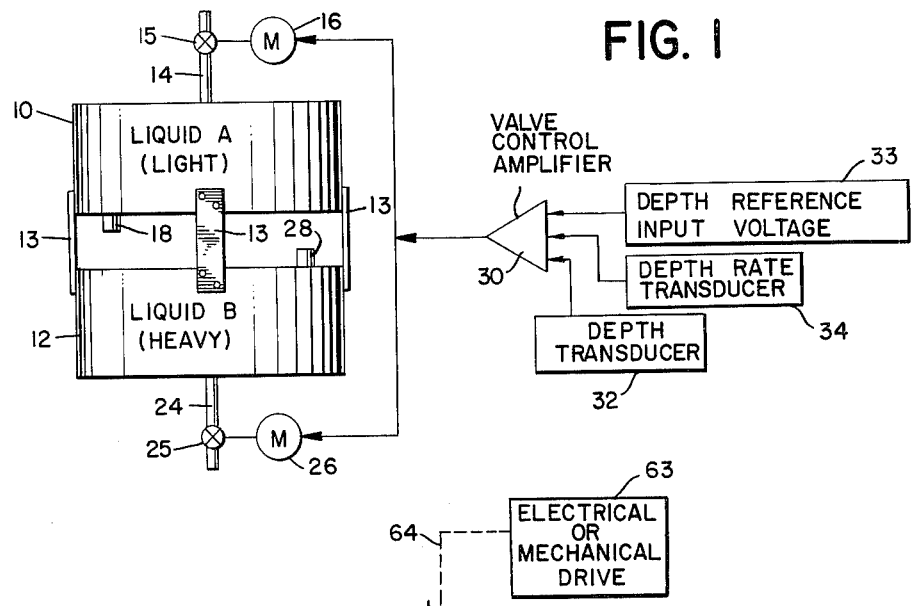
FIGURE 1 is a diagram illustrating the operating principles of the depth control system.

FIGURE 1 shows a system for adjusting the buoyancy of a submerged body or vessel to control its depth. The structural details of the vessel are omitted for the sake of clarity. The system includes two separate tanks 10 and 12 of substantially equal size which are respectively filled with liquids A and B of different specific gravities. In a preferred embodiment of the invention, liquid A in the tank 10 has a specific gravity which is less than that of the ambient medium in which the body is to be submerged while tank 12 has a liquid B whose specific gravity is greater than that of the ambient medium. In a typical application where the vessel is to be submerged in water, liquid A may be ordinary kerosene (specific gravity 0.82) while liquid B may be perchlorethylene (specific gravity 1.619). These liquids also will not mix readily with water and will thus remain separate in the tanks. Of course, other suitable liquids may be used where the vessel is to be submerged in water or any other ambient fluid, as would be apparent to those skilled in the art.

The two tanks 10 and 12 are shown joined together by a plurality of plates 13. Any other suitable fastening means can be used. A single tank may be utilized which is divided into two separate compartments, or else two separate tanks held within the confines of the vessel may be used.

Tank 10 has a conduit 14 in communication with its interior through which liquid A may be expelled or released into the ambient liquid. This is done by opening a valve 15 driven by a force motor 16. Tank 10 also has a vent opening 18 to communicate with the ambient fluid. It should be understood when valve 15 is opened the liquid A in tank 10 will be forced out through the conduit 14 by the ambient fluid entering the tank through vent 18 since the specific gravity of the ambient fluid is greater than that of liquid A.

Tank 12 has a similar arrangement of a conduit 24, valve 25 and force motor 26 for expelling liquid B into the ambient liquid. Tank 12 also has a vent opening 28 to the ambient fluid. It should be understood that with valve 25 open, liquid B in tank 12 will run out of the tank by the action of gravity since its specific gravity is greater than that of the ambient liquid. At the same time the fluid B will be replaced in tank 12 by ambient fluid entering through the vent opening 28.

The motors 16 and 26 operating the respective valves 15 and 25 are controlled by an amplifier 30 which is preferably of the difference type. Amplifier 30 receives three input signals, one from a transducer 32 which measures the actual depth of the vessel in the ambient fluid. Transducer 32 may be any suitable type of device, for example a bellows or twisted Bourdon tube pressure sensor, or any other pressure operated transducer, which drives a pick-off such as a potentiometer, to supply a voltage input signal to the amplifier 30. The second input to amplifier 30 is a depth reference voltage from source 33. This reference voltage is produced by any suitable arrangement, for example by a potentiometer connected to a voltage source. Source 33 is preferably made adjustable so that a reference voltage corresponding to a desired depth at which the vessel is to be maintained can be produced. The third input signal is from a depth rate, or velocity, transducer 34 which measures the speed of the vessel as it is changing its depth. The velocity signal from transducer 34 prevents hunting of the vessel about the preset depth when the system is to be operated to have the vessel achieve this function. This type of velocity control signal and its use in a servomechanism system is well known in the art.

Amplifier 30 compares its input voltages and produces an output voltage, or error signal, of a magnitude and polarity corresponding to the departure of the actual depth of the vessel as measured by transducer 32 from the desired depth set by the reference voltage from source 33. The error signal from amplifier 30, depending on its polarity, energizes one or the other of the motors 16 or 26 to open the corresponding valve 15 or 25. For example, amplifier 30 produces an error signal of the proper polarity to drive motor 16 and open valve 15 when the actual depth is less than the desired depth set out by source 33. Motor 26 is operated to open valve 25 when the actual depth is greater than the desired depth. Suitable differential motor drive systems of this type are well known in the art and no further description is necessary.

Consider now the operation of the system to produce hovering. The vessel is assumed to be submerged at its predetermined depth set by source 33 and with both valves 15 and 25 are closed. In this case neither liquid A nor B will flow out of the tanks 10 and 12. This is so because liquid A is lighter than the ambient fluid and it will not flow out of vent 18. On the other hand, liquid B is heavier than the ambient fluid and it will not flow out of vent 28. When valve 15 is opened by motor 16, in response to an amplifier error signal indicating that the vessel is above its preset depth, liquid A is forced out of tank 10 into the ambient fluid. This is brought about by the pressure differential between liquid A and the ambient fluid due to the difference in density between liquid A and the heavier ambient fluid which enters the tank 10 through the vent 18 and forces liquid A out through the open valve 15. Since the heavier ambient liquid displaces the same amount of the lighter liquid A in tank 10 the end result is a net loss in buoyancy for the vessel. This means that the vessel will sink deeper, i.e., assume a downward velocity, in the ambient fluid.

When valve 25 is opened by motor 26, in response to an error signal indicating that the vessel is below its preset depth, some of liquid B will flow out through the conduit 24. Its place in tank 12 will be taken by the lighter density ambient fluid entering through vent 28. This results in a net gain in positive buoyancy for the vessel so that its depth will decrease in the ambient fluid, i.e., assume an upward velocity.

As pointed out above, a difference signal is produced at the output of amplifier 30 representative of the error between the actual depth measured by transducer 32 and the predetermined depth set in by reference source 33. Depending upon whether the vessel is too high or too low with respect to the preset depth the error signal opens one or the other of the valves 15 or 25 through the operation of the force motors 16 and 26 thereby causing the loss of either light or heavy fluid. This adjusts the buoyancy of the vessel and causes it to move in a direction to reduce the depth error. When the error signal from amplifier 30 is zero, both the valves 15 and 25 are closed and no loss of fluid occurs. The vessel is then stabilized in a neutral buoyancy condition at a depth determined by the reference voltage from source 33. It should be understood that the system described provides for adjusting the buoyancy of the vessel to maintain its preset depth as long as any quantity of liquids A and B remain in the tank.

The system of FIGURE 1 may be operated to achieve only velocity control of the vessel so that it can ascend or descend at a predetermined velocity. In this case the signal from the depth transducer 32 would be removed and the reference voltage from source 33 would indicate a velocity rather than a depth. The signal produced by velocity transducer 34 would be compared with the reference voltage to produce the error voltage necessary to control the outflow of the two fluids at the rate needed to produce the desired vessel velocity.

Figure 2:
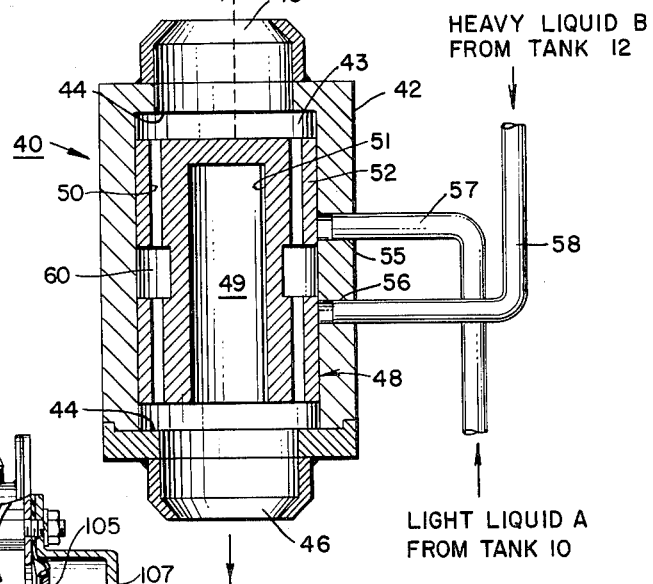
FIGURE 2 is an elevational view, taken in section, of a single valve for controlling the outflow of the two liquids.

FIGURE 2 shows a single valve 40 which combines the functions of both valves 15 and 25 of FIGURE 1. As will be described, valve 40 is either self-operating to maintain a predetermined depth or it may be operated by any suitable electrical or mechanical driving means.

The valve 40 has a housing 42 with an internal central bore or cavity 43 and upper and lower escape vents 45 and 46. A piston 48 is located in the cavity 43 free to move therein within the limits set by upper and lower shoulder stops 44. Piston 48 has an open central area 49 and a generally cylindrical passage 50 between the spaced inner and outer walls 51 and 52 which surround the central opening 49. The inner and outer walls 51 and 52 are held together by any suitable means (not shown).

The body 42 of the valve has two ports 55 and 56 into which two tubes 57 and 58 are connected. These tubes are also respectively in communication with the lighter density liquid A in tank 10 and the heavier density liquid B in tank 12. When using this valve, tank 10 must be below the valve and tank 12 above the valve. The outer wall 52 of the piston also has a circular groove 60 whose height is slightly smaller than the distance between the two ports 55 and 56. Therefore, depending upon the position of piston 48, both ports 55 and 56 can be closed or one of these ports can be opened in communication with groove 60 so that the fluid from the respective tank can flow out one of the vents 45 or 46 through the circular groove 60 which communicates with passage 50.

The operation of the valve 40 is as follows: When the system is immersed in the ambient fluid near the surface, the ambient pressure is relatively low. Chamber 49 will contain air at this low ambient pressure which will almost fill chamber 49. In this condition piston 48 will have positive buoyancy and float toward the top of housing 42. This opens port 55 and allows the lighter density fluid A to escape through the vent opening 45.

As explained previously, the escape of fluid A causes a loss of positive buoyancy so that the vessel will tend to sink to greater depths. When this occurs, the air trapped in chamber 49 becomes more highly compressed by ambient fluid entering through the bottom vent 46 and the piston 48 becomes less buoyant. At the neutral buoyancy point of the piston both ports are closed and the vessel will remain stationary.

At some time the vessel will reach a great enough depth so that the air in chamber 49 will be compressed by the water entering through bottom vent 46 to make piston 48 negatively buoyant. In this state piston 48 sinks to the bottom of valve 40, seals off port 55 and opens up port 56. This allows the heavy fluid B from tank 12 to escape through the bottom vent opening 46 to produce an increase in positive buoyancy of the system. This causes the vessel to start to rise.

When piston 48 is in the central position in housing 42, due to a neutral buoyancy condition brought about by an equilibrium pressure in chamber 49, both ports 55 and 56 will be closed and the vessel will remain relatively stationary. It should be understood that by suitably choosing the size of the chamber 49 and the weight of the piston 48, the depth at which the equilibrium pressure in the chamber 49 will be reached can be controlled. Thus, a vessel using valve 40 of FIGURE 2 can be made to hover or stay at a predetermined depth determined by the physical characteristics of the piston.

When operated in the manner previously described, the valve 40 is not self-adjusting to produce a desired depth rate. However, it should be understood that the valve 40 may also be controlled by a suitable electrical or mechanical drive means 63 through a mechanical linkage 64 connected to the piston 48. When an electrical drive means is used, the depth error system of FIGURE 1 may be utilized to control linkage 64, including the depth transducer 32, depth reference source 33, depth rate transducer 34 and the valve control amplifier 30. In this case, the velocity of the vessel may be controlled in the manner previously described. A bellows may be used in the mechanical drive system as the depth sensor.

FIGURE 3 shows a buoy-type instrument carrying vessel utilizing the flotation and depth control system of the present invention. The vessel includes an outer housing 70 which is of generally ellipsoid shape having upper and lower sections 71 and 72 bolted or otherwise fastened together at a seam 73. A two section approach is used for the vessel for ease of manufacture and assembly. A plate 73' seals off the two sections from each other.

A ballast weight container 74 having a releasable ballast weight therein is provided at the bottom of the lower section 72. This ballast is used to provide an initial high sinking rate. A separate fixed ballast 74' is provided to keep the buoy upright at all times. Container 74 is held to the housing 70 by a release mechanism 75 located within a sealed instrument compartment 78 whose upper end is closed by a cover 79. The release mechanism 75 is operated in response to a signal from the depth sensing transducer to drop the ballast 74. This is done at a point above the predetermined depth so that the vessel may be slowed to a stop at this predetermined depth. Any suitable mechanism may be utilized for dropping the ballast, for example, a chain or cable type of release. These mechanisms are well known in the art and no further description thereof is needed.

Located in a sepratate compartment 80 is a hydrophone of conventional construction. The hydrophone 81 is lowered and used for measuring purposes once the vessel has reached it predetermined depth.

The lower section 72 also contains the tank 10 for holding the lighter density liquid A. Tank 10 is beneath the instrument compartment 78 and a vent and check valve 18 is provided to permit filling of tank 10 with liquid A and venting to the ambient fluid.

The lower section 72 also holds a control valve 85, which in this case is a conventional three position spool valve (shown is schematic form in FIGURE 4) for releasing both liquids. Valve 85 is driven by mechanical linkage 64 which is operated by any suitable electrical or mechanical operated means in the manner previously described to control the outflow of the liquids A and B. A tube 57 extending through the instrument compartment 78 communicates with the top of tank A and conveys the light liquid A to the valve 85. The output of the valve is through a pipe 86 and a port 87 in the side of housing 70.

The remaining portion of the lower section 72 is flooded with the ambient liquid through a pipe 88. The ambient liquid entering into the lower section 72 through the pipe 88 communicates with the pressure sensing device 32 mounted outside of the instrument compartment 78. A conventional velocity sensing means 90 is also provided on the vessel to provide signals for stabilizing the hovering action and controlling velocity. Flooding of the lower section 72 reduces pressure differentials which might contribute to leakage.

The upper section 71 of the vessel is formed with a ring neck member 65 which permits lifting of the vessel. Neck member 65 is open at the top thereof so the ambient fluid can enter pipe 88. The upper section 71 also contains the tank 12 for liquid B and the vent 28 which extends on the outside of the vessel 70 for communication with the ambient fluid and for filling tank 12. A pipe 58 runs between the bottom of tank 12 and the control valve 85 in the lower section 72 of the vessel.

Located beneath the tank 12 is a floatation section 66 which contains sufficient height solid material to make the vessel buoyant.

The electrical wiring and components have been omitted from FIGURE 3 for the sake of clarity and these are shown in FIGURE 4. The system operates in the manner described below.

Before starting the dive, the depth setting for the release of the main ballast 74 is manually set to a potentiometer 100 whose upper end is connected to a suitable voltage source 102. A relay $K_4$ is energized whenever the voltage $V_3$ from the center arm of potentiometer 100 exceeds the output voltage $V_2$ of the pressure sensor 32. This is measured in a suitable voltage comparator circuit 104. Relay $K_4$ drops out when $V_3$ is less than $V_2$, which will occur when the vessel sinks to a depth greater than that represented by voltage $V_3$.

Energizing relay $K_4$ also energizes a main ballast release solenoid 106 which controls the ballast cable grip release mechanism 75 to hold ballast 74. The pull-in of relay $K_4$ also energizes relays $K_1$ and $K_2$. Light liquid A and heavy liquid B cut-off valves (not shown) are also preferably provided to prevent these liquids from flowing before the vessel is submerged near its desired depth. This is accomplished by two relays $K_5$ and $K_6$. A spring loaded piston (not shown) in the light liquid release circuit is also armed by energizing a relay $K_7$. When the piston is actuated by de-energizing relay $K_7$, a small quantity of the light density liquid A is released.

With the various aforesaid units energized, the operating sequence proceds by placing the vessel 70 in the ambient fluid (water) and releasing it. Due to the presence of the ballast 74, the vessel will sink with an increasing velocity determined by hydrodynamic considerations. When the vessel's velocity reaches a predetermined velocity which is less than the terminal velocity, a signal from velocity sensor 90 applied through a demodulator 92 will pull in a relay $K_3$. The vessel attains its terminal velocity and continues to descend until it reaches the depth setting represented by voltage $V_3$. At a depth slightly greater than this $V_3$ is less than $V_2$ and relay $K_4$ will drop out.

This de-energizes solenoid 106 which releases ballast 74. Since relays $K_2$ and $K_3$ were previously energized all other units remain energized.

The vessel now has a slight positive buoyancy and rapidly decelerates to a stop. As the velocity drops below the predetermined velocity, the reduction in signal from velocity sensor 90 causes relay $K_3$ to drop out. This de-energizes relays $K_5$ and $K_6$ opening the two liquid cut-off valves. At the same time relay $K_7$ is de-energized releasing the light liquid eject piston to release a quantity of liquid A to eliminate the condition of slight positive buoyancy. After this is done the vessel is very close to zero velocity and is very nearly neutrally buoyant.

During the entire descent with relay $K_1$ pulled in, a servomotor 110 is driven by the output of amplifier 30 to position a potentiometer 112 through a gear set 114 to produce a voltage $V_1$ to match the voltage $V_2$ from the absolute pressure sensor. Both voltages $V_1$ and $V_2$ are applied to amplifier 30. This mode of operation continues as long as relay $K_1$ remains energized. As the vessel comes to zero velocity and is made neutrally buoyant, relay $K_1$ drops out. The servomotor 110 stops and remains in position so that voltage $V_1$ now remains fixed. This voltage is now used as the depth reference voltage for desired depth $D_1$. At the same time, the voltage from the velocity sensor is connected to the amplifier 30 to provide a stabilizing signal and to provide velocity control. The difference $V_1-V_2$, which was originally amplified and used to drive the servomotor, now is used to position three-way valve spool 85 to control the flow of ballast liquids A and B.

As the vessel drifts away from depth $D_1$, the voltage $V_2$ changes a proportional amount and produces an error signal at the output of amplifier 30. The signal of the three-way valve 85 is positioned by a solenoid 115 operated by the error signal to actuate the liquid ballasting system so as to bring the vessel back to $D_1$ and reduce the different $V_2-V_1$ to zero. Thus, the vessel is made to hover about depth $D_1$.

The system has several other additional features. First of all when the descent velocity initially drops below the predetermined terminal velocity and the vessel is below the depth represented by $V_3$, relay $K_2$ drops out. Now even if the actual velocity were to exceed the predetermined velocity, relay $K_2$ remains open and the compensating system operates to return to depth $D_1$.

Additionally, if the electrical current were to fail, while the vessel is descending the main ballast would be released by de-energized solenoid 106 and the three-way control valve spool would be pulled by a biasing spring 116 to the position which would cause heavy liquid to flow out. This spool valve is held in the normally centered position against spring pressure by the bias coil current of solenoid 115 which flows whenever battery voltage is available.

Overpressure switches 109 and 107 are in series with the spool valve bias coil and the main ballast release solenoid 106. This switch is manually adjusted to any depth greater than $D_1$. If the vessel by accident reaches this excess depth, the overpressure switches will open, dropping the main ballast 74, and dumping the heavy liquid.

Figure 5:
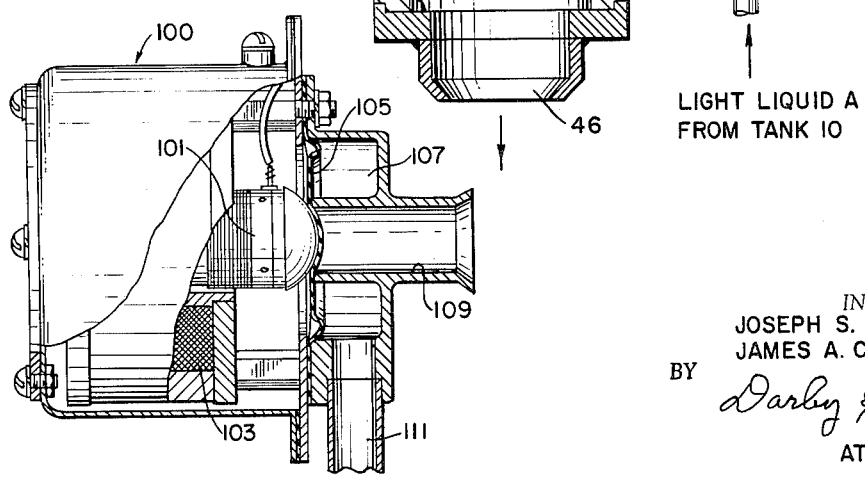
FIGURE 5 is a view, partially broken away, of another form of valve.

FIGURE 5 shows another type of valve 100 which can be used with the depth control system and more particularly with an embodiment thereof such as is shown in FIGURE 1. This valve includes a plunger member 101 which is movable within a magnetic core 103. A flexible diaphragm 105 is moved by the front end of plunger 101 in response to the error signal produced by the valve control amplifier 30 which is applied to a coil wound over the plunger. With no error signal applied the plunger and the diaphragm are in the fully extended position shown and an annular passageway 107 is sealed off from communication with a fluid exit passage 109. The fluid from a respective heavy or light fluid supply tank is applied to the annular passage through a pipe 111. When an error signal is applied to the valve, the plunger and diaphragm are retracted a corresponding amount and thereby providing communication between passageway 107 and the exit passage 109 and discharge of the fluid into the ambient medium occurs.

It should be understood that the control signal to operate valve 100 is developed in the manner previously described and contains depth and/or velocity information. Also, valve 100 may be used in a system similar to that of FIG. 1 or of FIG. 3. The latter requires a suitable modification of replacing the spool valve 85 with two valves 100 connected to the respective outlet pipes 57 and 58 and using the error control signal to operate both valves. In this case the error signal, which would be positive or negative depending upon which valve is to be opened, would be applied to the respective valves through suitably polarized steering diodes. An amplifier may be used, if needed, to invert the polarities of the error signals.

While preferred embodiments of the invention have been described above, it will be understood that these are illustrative only, and the invention is limited solely by the appended claims.

What is claimed is:

1. A system for controlling the depth of a vessel to be submerged in an ambient medium comprising on said vessel:
   a quantity of a first material whose specific gravity is greater than that of the ambient medium,
   a quantity of a second material whose specific gravity is less than that of the ambient medium,
   first means for establishing a predetermined depth reference level for said vessel in said ambient medium,
   second means for measuring the actual depth of the vessel in the ambient medium,
   and means connected to said first and second means for controllably releasing amounts of said first and second materials from said vessel to adjust its buoyancy to stabilize the vessel at said predetermined depth.

2. A system for controlling the velocity of a vessel to be submerged in an ambient medium comprising on said vessel:
   a quantity of a first material whose specific gravity is greater than that of the ambient medium,
   a quantity of a second material whose specific gravity is less than that of the ambient medium,
   first means for establishing a predetermined velocity for said vessel in said medium,
   second means for measuring the velocity of said vessel in said medium,
   and means responsive to said first and second means for controllably releasing quantities of said first and second materials from said vessel at a rate to achieve said predetermined velocity.

3. A system for controlling the depth and velocity of a vessel to be submerged in an ambient medium comprising on said vessel:
   a quantity of a first material whose specific gravity is greater than that of the ambient medium,
   a quantity of a second material whose specific gravity is less than that of the ambient medium,
   means adapted for communication with said first and second materials and said ambient medium,
   first means for establishing a predetermined depth reference level for said vessel in said ambient medium,
   second means for measuring the actual depth of the vessel in the ambient medium,
   third means for measuring the velocity of said vessel in the ambient medium,
   and means connected to said first, second and third means for controllably releasing amounts of said first and second materials from said vessel, the released material being replaced by the ambient medium through said communicating means to adjust the buoyancy of the vessel whereby the vessel is stabilized at said predetermined depth.

4. A system for controlling the depth of a vessel to be submerged in an ambient fluid comprising on said vessel:
means containing a quantity of a first fluid whose specific gravity is greater than that of the ambient fluid and a quantity of a second fluid whose specific gravity is less than that of the ambient fluid,
means adapted for communication with said ambient fluid and said containing means,
valve means connected to said containing means for controllably releasing amounts of said containing fluids, the fluid released from said first and second means being replaced by said ambient fluid whereby the buoyancy of the vessel is adjusted,
and means connected to said valve means and responsive to the departure in depth of said vessel from a predetermined depth for operating said valve means.

5. A system as set forth in claim 4 wherein a third means is provided for measuring the velocity of the vessel in the ambient medium, and said third means is also connected to said valve operating means for controlling the rate of release of the first and second fluids.

6. A system as set forth in claim 5 wherein said valve operating means is a force motor and means are provided to produce an error signal corresponding to the departure of the actual depth of the vessel from a predetermined depth and/or velocity to operate said force motor.

7. A system as set forth in claim 5 wherein said valve means is a spool valve and said valve operating means operates the movable element of said spool valve.

8. A system for controlling the velocity of a vessel operating submerged in an ambient fluid comprising on said vessel:
means containing a quantity of a first fluid whose specific gravity is greater than that of the ambient fluid and
a quantity of a second fluid whose specific gravity is less than that of the ambient fluid,
means adapted for communication with said ambient fluid and said containing means,
valve means connected to said containing means for controllably releasing amounts of said first and second fluids, the fluid released from said containing means being replaced by said ambient fluid whereby the buoyancy of the vessel is adjusted,
means for measuring the velocity of the vessel in the ambient medium,
and means connected to said valve means and responsive to the velocity of said vessel for controlling the rate of operation of said valve mean and thereby the rate of release of the first and second fluids.

9. A system for controlling the depth of a vessel to be submerged in an ambient fluid comprising on said vessel:
means containing a quantity of a first fluid whose specific gravity is greater than that of the ambient fluid and
a quantity of a second fluid whose specific gravity is less than that of the ambient fluid,
means adapted for communication with said ambient fluid and said containing means,
valve means connected to said containing means for controllable releasing amounts of said first and second fluids, the fluid released from said containing means being replaced by said ambient fluid whereby the buoyancy of the vessel is adjusted,
means for producing a first signal corresponding to a predetermined depth for said vessel,
means for measuring the actual depth of said vessel and producing a second signal representative thereof,
means for comparing said first and second signals to produce a third signal corresponding to the departure in actual depth of said vessel from said predetermined depth,
and means connected to said valve means and responsive to said third signal for operating said valve means to release an amount of one or the other of said fluids to stabilize said vessel at said predetermined depth.

10. A system as set forth in claim 9 wherein means are provided for measuring the velocity of the vessel in the ambient fluid and producing a fourth signal representative thereof which is applied to said comparing means whereby the third signal produced by said comparing means and applied to said valve operating means releases said fluids at a controllable rate.

11. A system for controlling the depth of a vessel to be submerged in an ambient fluid comprising on said vessel:
means containing a quantity of a first fluid whose specific gravity is greater than that of the ambient fluid and
quantity of a second fluid whose specific gravity is less than that of the ambient fluid,
means adapted for communication with said ambient fluid and said containing means,
valve means connected to said containing means for controllably releasing amounts of said first and second fluids, the fluid released from said containing means being replaced by said ambient fluid whereby the buoyancy of the vessel is adjusted,
means for producing a first signal corresponding to a predetermined depth for said vessel,
means for measuring the actual depth of said vessel and producing a second signal representative thereof,
means for comparing said first and second signals to produce a third signal corresponding to the departure in actual depth of said vessel from said predetermined depth,
a ballast weight,
a release means connected to said ballast weight and responsive to said second signal for releasing the ballast weight at a depth above said predetermined depth where the vessel will have positive buoyancy,
and means connected to said valve means and operative in response to said third signal after the ballast weight has been released for operating said valve means to release an amount of one or the other of said fluids to stabilize said vessel at said predetermined depth.

References Cited by the Examiner
UNITED STATES PATENTS

| | | | |
|---|---|---|---|
| 817,442 | 4/1906 | Page | 244—97 |
| 2,887,976 | 5/1959 | Hanna et al. | 114—16 |
| 2,972,972 | 2/1961 | Allen | 114—16 |
| 3,058,694 | 10/1962 | Fazio et al. | 244—31 |

OTHER REFERENCES

"High Performance Ships" by Stanley Daroff of the Office of Naval Research (From the Third Symposium on Naval Hydrodynamics 1961) pp. 475–481.

MILTON BUCHLER, *Primary Examiner.*

T. M. BLIX, *Assistant Examiner.*

UNITED STATES PATENT OFFICE
CERTIFICATE OF CORRECTION

Patent No. 3,228,369 January 11, 1966

Joseph S. Warhurst et al.

It is hereby certified that error appears in the above numbered patent requiring correction and that the said Letters Patent should read as corrected below.

Column 1, line 16, for "the depth" read -- that depth --; line 30, for "described" read -- desired --; column 5, line 72, for "it" read -- its --; column 6, line 5, for "is" read -- in --; column 7, line 38, for "different" read -- difference --; column 9, line 13, for "containing" read -- first and second --; line 14, for "first and second" read -- containing --; line 53, for "mean" read -- means --; line 66, for "controllable" read -- controllably --; column 10, line 26, before "quantity" insert -- a --.

Signed and sealed this 21st day of June 1966.

(SEAL)
Attest:

ERNEST W. SWIDER
Attesting Officer

EDWARD J. BRENNER
Commissioner of Patents